(12) United States Patent
Mu et al.

(10) Patent No.: US 11,799,298 B1
(45) Date of Patent: Oct. 24, 2023

(54) SYSTEM AND METHOD FOR FREQUENCY MODULATION BASED ON DIRECT CURRENT CONTROLLABLE LOAD

(71) Applicant: Xi'an Thermal Power Research Institute Co., Ltd, Shaanxi (CN)

(72) Inventors: Chunhua Mu, Shaanxi (CN); Peihao Yang, Shaanxi (CN); Pengyue Wu, Shaanxi (CN); Ganghu Sun, Shaanxi (CN); Faguang Liang, Shaanxi (CN); Dongfeng Chang, Shaanxi (CN); Zaisong Yu, Shaanxi (CN); Feng Gao, Shaanxi (CN); Shuichao Kou, Shaanxi (CN); Qi Chai, Shaanxi (CN); Xiaohui Wang, Shaanxi (CN); Liang Zhao, Shaanxi (CN); Wei Wang, Shaanxi (CN); Shuting Liang, Shaanxi (CN); Xinyu Guo, Shaanxi (CN); Hao Guo, Shaanxi (CN); Lisong Zhang, Shaanxi (CN); Yunfei Yan, Shaanxi (CN); Lei Xue, Shaanxi (CN); Junbo Zhao, Shaanxi (CN); Ting He, Shaanxi (CN); Zhipeng Li, Shaanxi (CN); Huanhuan Gao, Shaanxi (CN); Jiewen Wang, Shaanxi (CN); Yulun Chen, Shaanxi (CN); Mengyao Sun, Shaanxi (CN); Benqian Dai, Shaanxi (CN); Yue Yin, Shaanxi (CN); Jinghua Li, Shaanxi (CN)

(73) Assignee: XI'AN THERMAL POWER RESEARCH INSTITUTE CO., LTD, Shaanxi (CN)

( * ) Notice: Subject to any disclaimer, the term of this patent is extended or adjusted under 35 U.S.C. 154(b) by 0 days.

(21) Appl. No.: 18/337,835

(22) Filed: Jun. 20, 2023

(30) Foreign Application Priority Data

Sep. 5, 2022 (CN) .......................... 202211078801.0

(51) Int. Cl.
*H02J 3/38* (2006.01)
*H02J 3/46* (2006.01)
*H02J 3/36* (2006.01)

(52) U.S. Cl.
CPC ................ *H02J 3/381* (2013.01); *H02J 3/36* (2013.01); *H02J 3/46* (2013.01); *H02J 2300/10* (2020.01)

(58) Field of Classification Search
CPC ...... H02J 3/381; H02J 3/36; H02J 3/46; H02J 2300/10

(Continued)

(56) References Cited

U.S. PATENT DOCUMENTS

2006/0061213 A1* 3/2006 Michalko .................. H02J 4/00
307/9.1
2017/0054291 A1* 2/2017 Qi .......................... H02H 3/025

FOREIGN PATENT DOCUMENTS

CN 108199389 6/2018
CN 110011358 7/2019

(Continued)

OTHER PUBLICATIONS

CNIPA, First Office Action for CN Application No. 202211078801.0, dated Oct. 18, 2022.

(Continued)

*Primary Examiner* — Michael R. Fin
(74) *Attorney, Agent, or Firm* — Hodgson Russ LLP

(57) ABSTRACT

The system for frequency modulation based on Direct Current (DC) controllable load for a high-voltage plant includes a frequency modulator and a DC-controllable load for the high-voltage plant connected to the frequency modulator. The frequency modulator includes a centralized rectifier configured to adjust power of loads in the DC-controllable load in response to a frequency modulation command.

(Continued)

The DC-controllable load is configured to respond to an adjustment of the power of loads performed by the centralized rectifier.

8 Claims, 5 Drawing Sheets

(58) Field of Classification Search
USPC .......................................................... 307/43
See application file for complete search history.

(56) References Cited

FOREIGN PATENT DOCUMENTS

| CN | 111478376 | 7/2020 |
| CN | 212412777 | 1/2021 |
| CN | 114825451 | 7/2022 |
| JP | 2003148170 | 5/2003 |

OTHER PUBLICATIONS

CNIPA, Notification to Grant Patent Right for Invention for CN Application No. 202211078801.0, dated Oct. 24, 2022.

* cited by examiner

US 11,799,298 B1

SYSTEM AND METHOD FOR FREQUENCY MODULATION BASED ON DIRECT CURRENT CONTROLLABLE LOAD

CROSS REFERENCE TO RELATED APPLICATIONS

This application claims priority to Chinese Application No. 202211078801.0, filed on Sep. 5, 2022, the entire disclosure of which is incorporated herein by reference.

TECHNICAL FIELD

The disclosure relates to a field of frequency modulation technologies, in particular to a system and a method for fossil-fuel-power frequency modulation based on a DC controllable load for a high-voltage plant.

BACKGROUND

With the increase of grid connection of wind power and energy storage, the rapid development of large interconnected power grid, high-capacity power generation and long-distance power transmission, the frequency modulation task of the power system has become more onerous. The existing frequency modulation method for the power system is mainly through adjusting the capacity of the generator set or cutting off the user load, to balance the power difference between the generator side and the load side, so as to achieve stable control of the system frequency. Or, Alternating Current (AC) controllable load can be added to the power system side involved in the frequency modulation.

SUMMARY

A first aspect of embodiments of the disclosure provides a system for fossil-fuel-power frequency modulation based on a DC-controllable load for a high-voltage plant. The system includes: a frequency modulator and a DC-controllable load for a high-voltage plant, the frequency modulator is connected to the DC-controllable load for the high-voltage plant.

The frequency modulator includes: a centralized rectifier configured to adjust power of loads in the DC-controllable load for the high-voltage plant in response to a frequency modulation command.

The DC-controllable load for the high-voltage plant is configured to respond to an adjustment of the power of loads performed by the centralized rectifier.

A second aspect of embodiments of the disclosure provides a method for fossil-fuel-power frequency modulation based on a DC-controllable load for a high-voltage plant. The method includes:
 obtaining a frequency modulation command, and determining an active power to be adjusted based on the frequency modulation command; and
 adjusting, based on the active power to be adjusted, power of loads in the DC-controllable load for the high-voltage plant by a centralized rectifier and responding to the frequency modulation command.

A third aspect of embodiments of the disclosure provides an electronic device. The electronic device includes: a memory, a processor and a computer program stored on the memory and executable by the processor. When the computer program is executed by the processor, the method according to the second aspect of the embodiments is performed.

Additional aspects and advantages of the disclosure will be given in part in the following description, and will become apparent in part from the following description, or be learned from the practice of the disclosure.

BRIEF DESCRIPTION OF THE DRAWINGS

These and other aspects and advantages of embodiments of the disclosure will become apparent and more readily appreciated from the following descriptions made with reference to the accompanying drawings.

Figure 1:
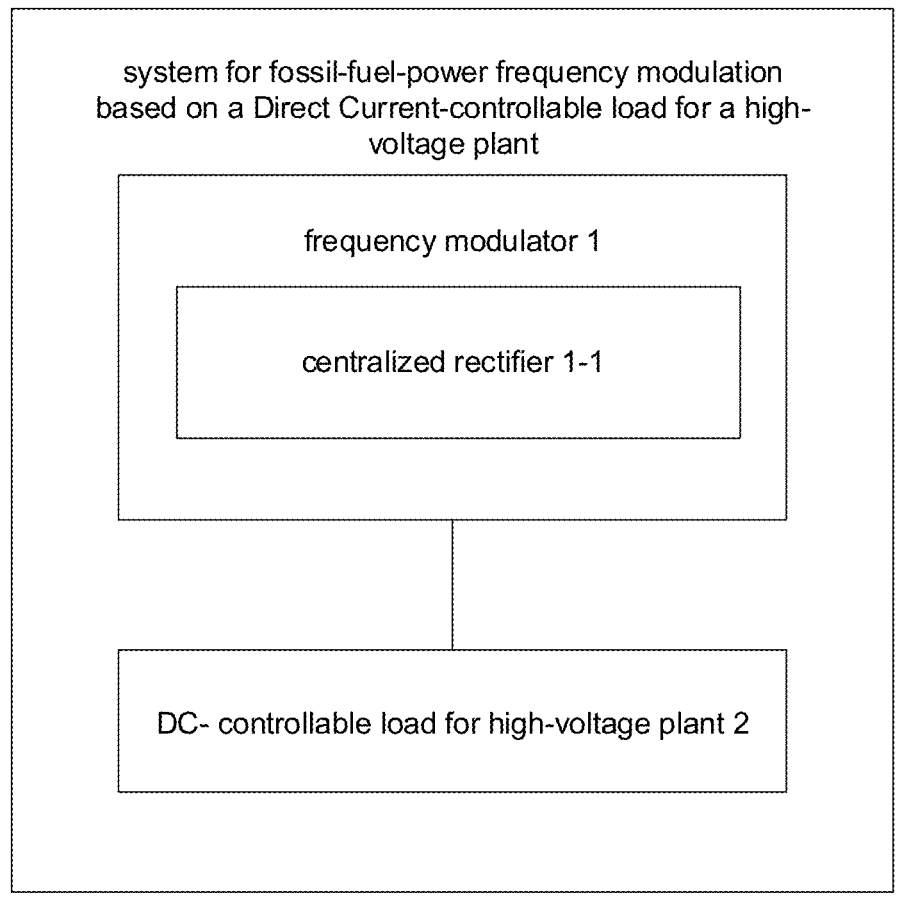
FIG. 1 is a schematic diagram illustrating a system for fossil-fuel-power frequency modulation based on a DC-controllable load for a high-voltage plant according to embodiments of the disclosure.

REFERENCE NUMBERS IN THE DRAWINGS frequency modulator 1, DC-controllable load 2 for a high-voltage plant, centralized rectifier 1-1, generator 1-2, main transformer 1-3 of generator 1-2, split-winding step-down transformer 1-4 for the high-voltage plant, first centralized rectifier 1-1-1, second centralized rectifier 1-1-2, first controllable load switch 1-5 for grid connection of a first controllable plant load, second controllable load switch 1-6 for grid connection of a second controllable plant load, first 8.5 KV DC bus 2-1, first high-voltage motor inversion driver 2-2, first high-voltage motor switch 2-3 for grid connection of a first high-voltage motor 2-4, first high-voltage motor 2-4, first high-voltage load inversion power supply 2-5, first high-voltage load switch for grid connection of a first high-voltage load 2-7, first high-voltage load 2-7, first low-power load DC-DC step-down isolator 2-8, first low-power load DC circuit breaker 2-9, first low-power load 2-10, first low-power load low-voltage DC converge bus 2-10-1, first section-1 low-power load inversion power supply 2-10-2, first section-1 low-power load 2-10-3, first section-2 low-power load inversion power supply 2-10-4, first section-2 low-power load 2-10-5, second 8.5 KV DC bus 2-11, second high-voltage motor inversion driver 2-12, second high-voltage motor switch 2-13 for grid connection of a second high-voltage motor 2-14, second high-voltage motor 2-14, second high-voltage load inversion power supply 2-15, second high-voltage load switch 2-16 for grid connection of a second high-voltage load 2-17, second high-voltage load 2-17, second low-power load DC-DC step-down isolator 2-18, second low-power load DC circuit breaker 2-19, second low-power load 2-20, second low-power load low-voltage DC converge bus 2-20-1, second section-1 low-power load inversion power supply 2-20-2, second section-1 low-power load 2-20-3, second section-2 low-power load inversion power supply 2-20-4, and second section-2 low-power load 2-20-5.

DETAILED DESCRIPTION

Embodiments of the disclosure are described in detail below, and examples of the embodiments are shown in the accompanying drawings, in which the same or similar numbers indicate the same or similar components or components having the same or similar functions. The embodiments described below by reference to the accompanying drawings are exemplary and are intended to be used to explain the disclosure and are not to be construed as limiting the disclosure.

With the increase of grid connection of wind power and energy storage, the rapid development of large interconnected power grid, high-capacity power generation and long-distance power transmission, the frequency modulation task of the power system has become more onerous. The existing frequency modulation method for the power system is mainly through adjusting the capacity of the generator set or cutting off the user load, to balance the power difference between the generator side and the load side, so as to achieve stable control of the system frequency. Or, Alternating Current (AC) controllable load can be added to the power system side involved in the frequency modulation. However, with the way of adding the AC controllable load, it needs to consider the problem of reactive compensation and the range of failure will be expanded if the failure occurs, which makes the frequency modulation more cumbersome and less safe.

The disclosure provides a system for fossil-fuel-power frequency modulation based on a Direct Current (DC)-controllable load for a high-voltage plant, and a method for fossil-fuel-power frequency modulation based on a DC-controllable load for a high-voltage plant. The system includes: a frequency modulator and a DC-controllable load for the high-voltage plant, the frequency modulator connected to the DC controllable load for the high-voltage plant. The frequency modulator includes: a centralized rectifier configured to adjust a load power of the DC-controllable load for the high-voltage plant in response to a frequency modulation command. The DC-controllable load for the high-voltage plant is configured to respond to an adjustment of the load power performed by the centralized rectifier. With the technical solutions according to the disclosure, the centralized rectifier can be used to uniformly adjust the load of the DC-controllable load for the high-voltage plant. Therefore, the safety of frequency modulation is improved and the frequency modulation method is simple.

A system for fossil-fuel-power frequency modulation based on a DC-controllable load for a high-voltage plant, and a method for fossil-fuel-power frequency modulation based on a DC-controllable load for a high-voltage plant according to embodiments of the disclosure will be described below with reference to the attached drawings.

Embodiment 1

FIG. 1 is a schematic diagram illustrating a system for fossil-fuel-power frequency modulation based on a DC-controllable load for a high-voltage plant according to embodiments of the disclosure. As illustrated in FIG. 1, the system includes: a frequency modulator 1 and a DC-controllable load 2 for a high-voltage plant. The frequency modulator 1 is connected to the DC-controllable load 2 for the high-voltage plant.

The frequency modulator 1 includes: a centralized rectifier 1-1 configured to adjust a load power of the DC-controllable load 2 for the high-voltage plant in response to a frequency modulation command.

The DC-controllable load 2 for the high-voltage plant is configured to respond to an adjustment of the load power performed by the centralized rectifier 1-1.

Figure 2:
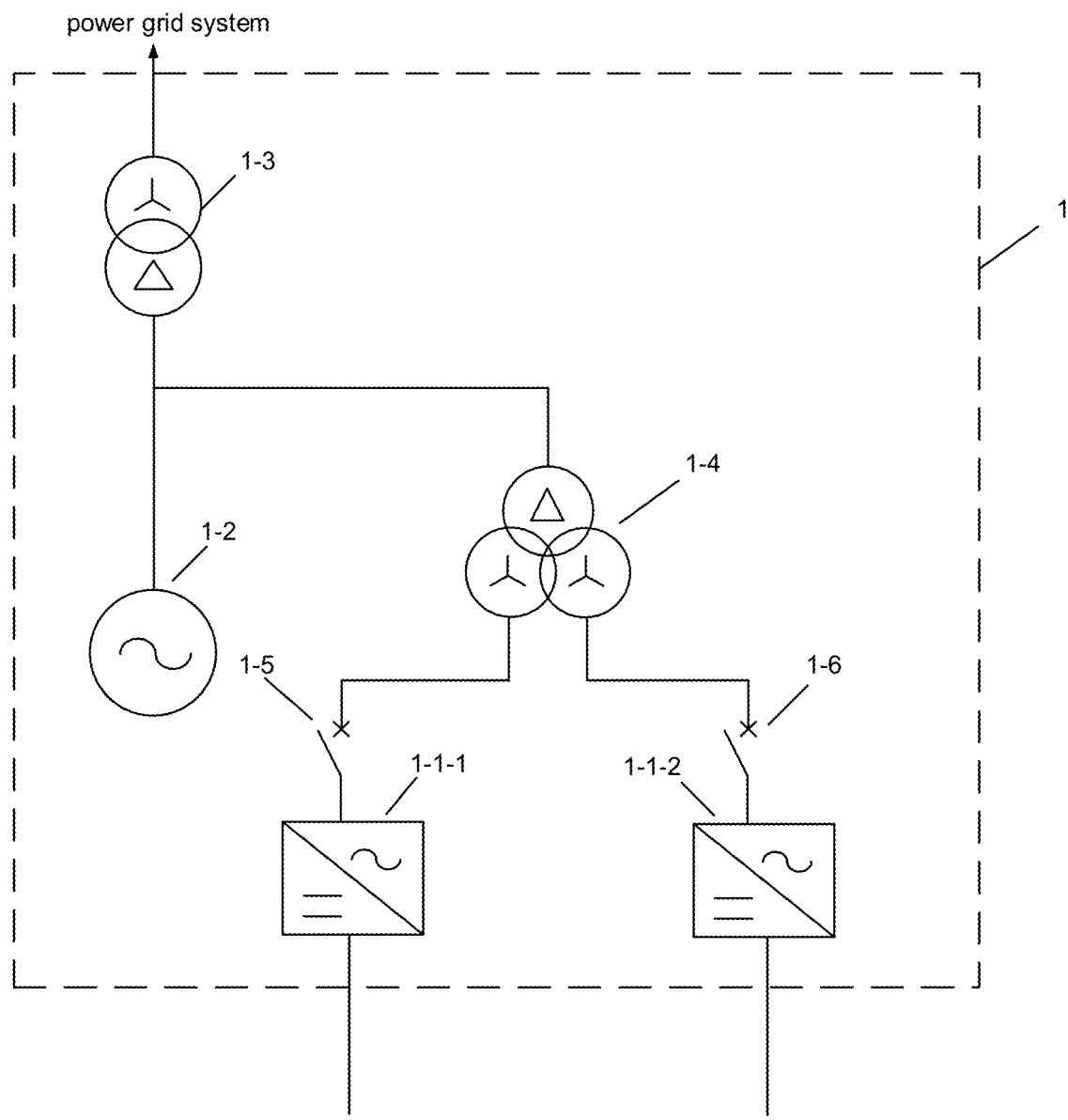
FIG. 2 is a schematic diagram illustrating a frequency modulator according to embodiments of the disclosure.

In embodiments of the disclosure, as illustrated in FIG. 2, the frequency modulator 1 further includes: a generator 1-2, a main transformer 1-3 of the generator 1-2, and a split-winding step-down transformer 1-4 for the high-voltage plant.

The generator 1-2 is connected to a grid system through the main transformer 1-3 of the generator 1-3.

A high-voltage side of the split-winding step-down transformer 1-4 for the high-voltage plant is connected to an outlet of the generator 1-2.

As illustrated in FIG. 2, the frequency modulator 1 further includes a first controllable plant load switch 1-5 for grid connection of a first controllable plant load and a second controllable plant load switch 1-6 for grid connection of a second controllable plant load.

The centralized rectifier 1-1 includes a first centralized rectifier 1-1-1 and a second centralized rectifier 1-1-2.

The first centralized rectifier 1-1-1 is connected to a low-voltage side winding A of the split-winding step-down transformer 1-4 for the high-voltage plant via the first controllable plant load switch 1-5 for grid connection of the first controllable plant load.

The second centralized rectifier 1-1-2 is connected to a low-voltage side winding B of the split-winding step-down transformer 1-4 for the high-voltage plant via the second controllable plant load switch 1-6 for grid connection of the second controllable plant load.

Figure 3:
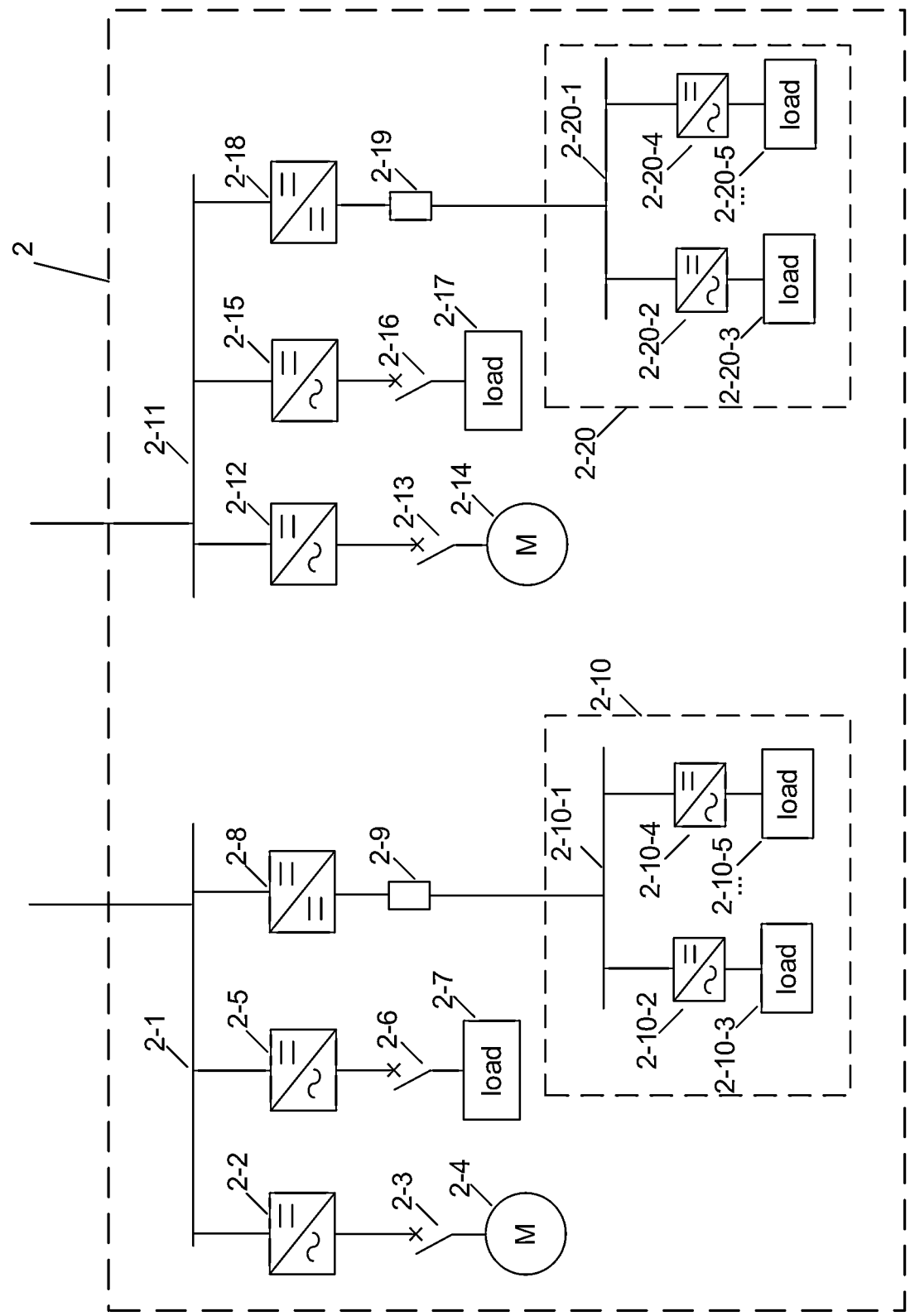
FIG. 3 is a schematic diagram illustrating a DC-controllable load for a high-voltage plant according to embodiments of the disclosure.

As illustrated in FIG. 3, the DC-controllable load 2 for the high-voltage plant includes a first 8.5 KV DC bus 2-1, a first high-voltage motor inversion driver 2-2, a first high-voltage motor 2-4, a first high-voltage motor switch 2-3 for grid connection of the first high-voltage motor 2-4, a first high-voltage load inversion power supply 2-5, a first high-voltage load 2-7, and a first high-voltage load switch 2-6 for grid connection of the first high-voltage load 2-7.

The first high-voltage motor 2-4 is connected to the first high-voltage motor inversion driver 2-2 via the first high-voltage motor switch 2-3 for grid connection of the first high-voltage motor 2-4.

The first high-voltage motor inversion driver 2-2 is connected to the first 8.5 KV DC bus 2-1.

The first high-voltage load 2-7 is connected to the first high-voltage load inversion power supply 2-5 via the first high-voltage load switch 2-6 for grid connection of the first high-voltage load 2-7.

The first high-voltage load inversion power supply 2-5 is connected to the first 8.5 KV DC bus 2-1.

As illustrated in FIG. 3, the DC-controllable load 2 for the high-voltage plant further includes: a first low-power load DC-DC step-down isolator 2-8, a first low-power load DC circuit breaker 2-9 and a first low-power load 2-10.

The first low-power load 2-10 is connected to the first low-power load DC-DC step-down isolator 2-8 via the first low-power load DC circuit breaker 2-9.

The first low-power load DC-DC step-down isolator 2-8 is connected to the first 8.5 KV DC bus 2-1.

The first low-power load 2-10 includes a first low-power load low-voltage DC converge bus 2-10-1, a first section-1 low-power load inversion power supply 2-10-2, a first section-1 low-power load 2-10-3, a first section-2 low-power load inversion power supply 2-10-4, and a first section-2 low-power load 2-10-5.

One terminal of the first low-power load DC circuit breaker 2-9 is connected to the first low-power load low-voltage DC converge bus 2-10-1, and the other terminal is connected to the first low-power load DC-DC step-down isolator 2-8.

The first section-1 low-power load 2-10-3 is connected to the first low-power load low-voltage DC converge bus 2-10-1 via the first section-1 low-power load inversion power supply 2-10-2.

The first section-2 low-power load 2-10-5 is connected to the first low-power load low-voltage DC converge bus 2-10-1 via the first section-2 low-power load inversion power supply 2-10-4.

In embodiment of the disclosure, as illustrated in FIG. 3, the DC-controllable load 2 for the high-voltage plant further includes: a second 8.5 KV DC bus 2-11, a second high-voltage motor inversion driver 2-12, second high-voltage motor 2-14, a second high-voltage motor switch 2-13 for grid connection of a second high-voltage motor 2-14, a second high-voltage load inversion power supply 2-15, a second high-voltage load 2-17, and a second high-voltage load switch 2-16 for grid connection of the second high-voltage load 2-17.

The second high-voltage motor 2-14 is connected to the second high-voltage motor inversion driver 2-12 via the second high-voltage motor switch 2-13 for grid connection of the second high-voltage motor 2-14.

The second high-voltage motor inversion driver 2-12 is connected to the second 8.5 KV DC bus 2-11.

The second high-voltage load 2-17 is connected to the second high-voltage load inversion power supply 2-15 via the second high-voltage load switch 2-16 for grid connection of the second high-voltage load 2-17.

The second high-voltage load inversion power supply 2-15 is connected to the second 8.5 KV DC bus 2-11.

As illustrated in FIG. 3, the DC-controllable load 2 for the high-voltage plant further includes a second low-power load DC-DC step-down isolator 2-18, a second low-power load DC circuit breaker 2-19 and a second low-power load 2-20.

The second low-power load 2-20 is connected to the second low-power load DC-DC step-down isolator 2-18 via the second low-power load DC circuit breaker 2-19.

The second low-power load DC-DC step-down isolator 2-18 is connected to the second 8.5 KV DC bus 2-11.

The second low-power load 2-20 includes a second low-power load low-voltage DC converge bus 2-20-1, a second section-1 low-power load inversion power supply 2-20-2, a second section-1 low-power load 2-20-3, a second section-2 low-power load inversion power supply 2-20-4, and a second section-2 low-power load 2-20-5.

One terminal of the second low-power load DC circuit breaker 2-19 is connected to the second low-power load low-voltage DC converge bus 2-20-1, and the other terminal is connected to the second low-power load DC-DC step-down isolator 2-18.

The second section-1 low-power load 2-20-3 is connected to the second low-power load low-voltage DC converge bus 2-20-1 via the second section-1 low-power load inversion power supply 2-20-2.

The second section-2 low-power load 2-20-5 is connected to the second low-power load low-voltage DC converge bus 2-20-1 via the second section-2 low-power load inversion power supply 2-20-4.

For example, based on an adjustment amount for the power of the controllable load corresponding to the frequency modulation command, the first centralized rectifier 1-1-1 and/or the second centralized rectifier 1-1-2 can be used to adjust the electric power of the first high-voltage motor 2-4, the first high-voltage load 2-7, the first section-1 low-power load 2-10-3, the first section-2 low-power load 2-10-5, the second high-voltage motor 2-14, the second high-voltage load 2-17, the second section-1 low-power load 2-20-3, and the second section-2 low-power load 2-20-5.

When the power to be adjusted is relatively large, both the first centralized rectifier 1-1-1 and the second centralized rectifier 1-1-2 are used to adjust the electric power of the DC-controllable load 2 for the high-voltage plant. When the power to be adjusted is relatively small, either the first centralized rectifier 1-1-1 or the second centralized rectifier 1-1-2 is used to perform the electric power adjustment on the loads included in the DC-controllable load 2 for the high-voltage plant. The loads included in the DC-controllable load 2 for the high-voltage plant includes the first high-voltage motor 2-4, the first high-voltage load 2-7, the first section-1 low-power load 2-10-3, the first section-2 low-power load 2-10-5, the second high-voltage motor 2-14, the second high-voltage load 2-17, the second section-1 low-power load 2-20-3, and the second section-2 low-power load 2-20-5. In this way, the load participating in the electric power adjustment can be selected from a large range of loads and the adjustment is more precise.

There may be more than one section-1 low-power load inversion power supply and more than one section-1 low-power load, and each section-1 low-power load corresponds to a respective section-1 low-power load inversion power supply. Also, there may be more than one section-2 low-power load inversion power supply and more than one section-2 low-power load, and each section-2 low-power load corresponds to a respective section-2 low-power load inversion power supply.

It is noteworthy that the first centralized rectifier 1-1-1 and the second centralized rectifier 1-1-2 both use fully-controlled power components for power electronics, to achieve independent adjustment of active power and independent adjustment of reactive power. With the use of the first centralized rectifier 1-1-1, the centralized rectification is realized without the need of configuring converters for the loads, thereby improving the electric energy conversion efficiency and reducing the load loss. Meanwhile, since the centralized rectifiers adopt the fully-controlled power components, the maximum short-circuit current is 1.5 times as high as the rated current, which does not require high dynamic stability or thermal stability for the circuit breaker, so that protection is simple and the failure range will not be expanded.

In embodiments of the disclosure, the centralized rectifier 1-1 can be controlled to flexibly adjust the electric power of the loads included in the DC-controllable load 2 for the high-voltage plant, so that the electric loads in the DC controllable load 2 for the high-voltage plant can be used as flexible and controllable loads to participate in the thermal power frequency modulation, which meets the demand of the power grid for modulating the frequency. Compared with the use of additional devices to perform the thermal power frequency modulation, the system according to the disclosure makes fewer changes to the electrical system of the plant and increases the utilization rate of the original electrical system of the plant.

It is understandable that compared to the traditional 6 kV DC bus, the first 8.5 KV DC bus bar 2-1 and the second 8.5 KV DC bus bar 2-11 used in the DC-controllable load 2 for the high-voltage plant increases the voltage level. In addition, the buses 2-1 and 2-2 used only needs a positive cable and a negative cable, which reduces amount of needed cables compared to the 6 kV which needs three-phase AC cables, thereby saving investment costs. Meanwhile, the positioning of the failure is simple for the 8.5 kV DC bus. Furthermore, since all used are power electronic components, the cost is relatively low, the internal circuitries of the electric loads can be simplified, the failure rate can be reduced, and the equipment costs can be reduced. Compared to the traditional 6 kV high-voltage system in the fossil-fuel power plant, the DC-controllable load 2 for the high-voltage plant uses the DC for supplying and distributing power, there is no harmonic wave management problems within the DC-controllable load 2, the power supply is stable, and the electric energy is of high quality. The DC-controllable load 2 for the high-voltage plant does not need to consider the phase angle and the frequency and can realize asynchronous system interconnection without any reactive power compensation problems.

Compared to the original system of the plant, the DC-controllable load 2 for the high-voltage plant can increase the power supply capacity, thereby facilitating subsequent connection to more loads. The DC networking is relatively simple, the load has the characteristic of power electronic modularity, access is simple without complex calibration, and power supply range is wide. Meanwhile, configuration protection for all kinds of motors, high-voltage loads, and low-voltage loads in the DC controllable load 2 for the high-voltage plant is relatively simple, the failure range will not be extended if the failure occurs, due to the isolation of the inverters. The use of fully-controlled power electronic components, in addition to current transformation, the AC and DC isolation and the voltage variation can be achieved. Moreover, the use of all power electronic components makes the power supply efficient, and there is no harmonic wave problems or voltage fluctuation impact problems since the DC is used for power supply.

Figure 4:
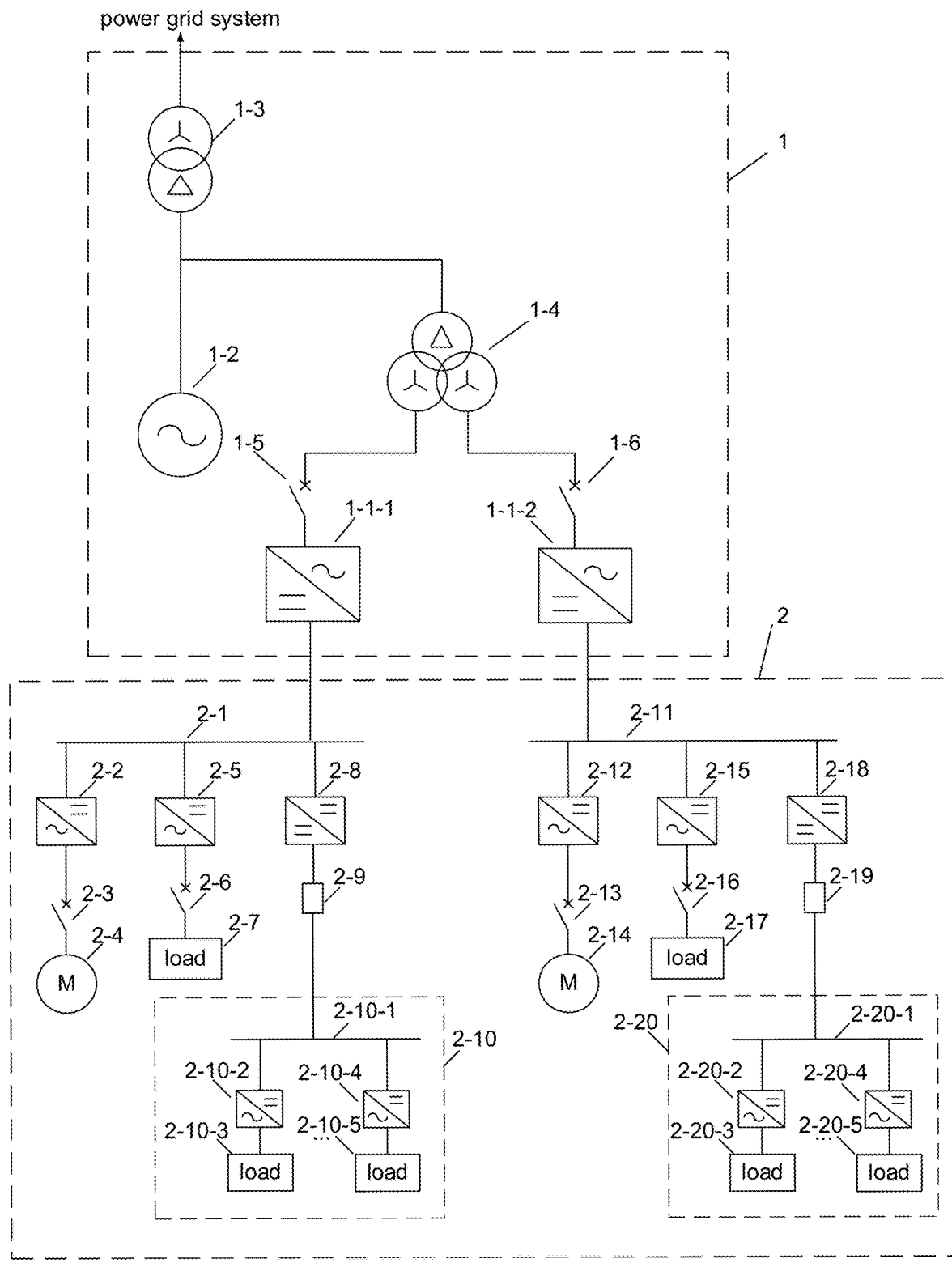
FIG. 4 is a schematic diagram illustrating a system for fossil-fuel-power frequency modulation based on a DC-controllable load for a high-voltage plant according to embodiments of the disclosure.

In embodiments of the disclosure, FIG. 4 illustrates an overall schematic diagram of a system for fossil-fuel-power frequency modulation based on a DC controllable load for a high-voltage plant. When receiving the frequency modulation command, the frequency modulator 1 determines the active power to be adjusted, and controls the electric power of each load in the DC-controllable load 2 for the high-voltage plant through the first centralized rectifier 1-1-1 and/or the second centralized rectifier 1-1-2 based on the active power to be adjusted, to realize the frequency variation driving of all kinds of motors, high-voltage electric loads, and low-voltage electric loads in the DC-controllable load 2 for the high-voltage plant, and the power adjustment is realized through the first high-voltage motor inversion driver 2-2, the first high-voltage load inversion power supply 2-5, the first section-1 low-power load inversion power supply 2-10-2, the first section-2 low-power load inversion power supply 2-10-4, the second high-voltage motor inversion driver 2-12, the second high-voltage load inversion power supply 2-15, the second section-1 low-power load inversion power supply 2-20-2, and the second section-2 low-power load inversion power supply 2-20-4 to respond to the change in the power, i.e., to respond to the frequency modulation command.

It is noteworthy that a new droop control solution is used to respond to frequency adjustment. The active-power frequency droop control equation is: $P-P_0=m(f-f_0)$, in which, P represents a target power to be adjusted for the generator corresponding to the frequency modulation command, $P_0$ represents an initial power of the generator, f represents a target frequency to be adjusted for the generator corresponding to the frequency modulation command, $f_0$ represents an initial frequency of the generator, m represents an active power droop coefficient, and $\Delta P$ represents a power modulation amount. In the system for fossil-fuel-power frequency modulation based on a DC controllable load for a high-voltage plant, $\Delta P$ represents the power modulation amount for the controllable load, and the above equation: $P-P_0=m(f-f_0)$ can also be expressed as: $\Delta P=m\Delta f$, where $\Delta f$ represents an offset of the grid frequency.

When the frequency of the power transmission line connected to the fossil-fuel-power unit, i.e., the generator, is decreasing, the active power of the loads of the fossil-fuel-power unit needs to decrease linearly in proportion, to suppress the decrease in frequency. When the frequency of the power transmission line connected to the fossil-fuel-power unit is increasing, the active power of the loads of the fossil-fuel-power unit needs to increase linearly in proportion, to suppress the increase in frequency.

By controlling the dynamic adjustment of the electric loads in the DC-controllable load 2 for the high-voltage plant, the change in the frequency of the fossil-fuel-power unit can be responded to in real time.

In conclusion, with the system according to embodiments of the disclosure, the centralized rectifier is used to uniformly perform the frequency modulation on the loads in the DC-controllable load for the high-voltage plant, thereby improving the safety of frequency modulation. Moreover, the frequency modulation method is relatively simple.

Embodiment 2

Figure 5:
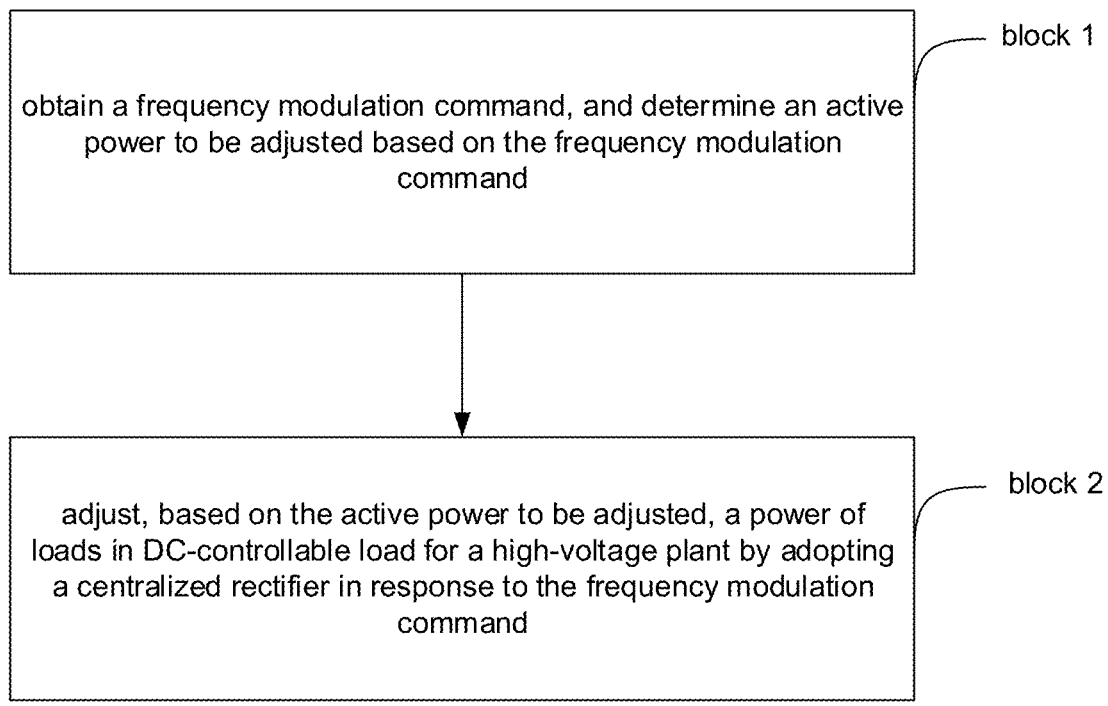
FIG. 5 is a flowchart illustrating a method for fossil-fuel-power frequency modulation based on a DC-controllable load for a high-voltage plant according to embodiments of the disclosure.

Embodiments of the disclosure provide a method for fossil-fuel-power frequency modulation based on a DC controllable load for a high-voltage plant. As illustrated in FIG. 5, the method includes the following.

At block 1, a frequency modulation command is obtained, and an active power to be adjusted is determined based on the frequency modulation command.

At block 2, based on the active power to be adjusted, power of loads in the DC-controllable load for the high-voltage plant is adjusted by adopting a centralized rectifier to response to the frequency modulation command.

The active power to be adjusted is calculated according to the following equation:

$$\Delta P=m(f-f_0),$$

where $\Delta P$ represents the active power to be adjusted, f represents a target frequency to be adjusted for the generator corresponding to the frequency modulation command, $f_0$ represents an initial frequency of the generator, and m represents an active power droop coefficient.

In conclusion, with the method for fossil-fuel-power frequency modulation based on a DC-controllable load for a high-voltage plant according to embodiments of the disclosure, the centralized rectifier can be used to uniformly perform the frequency modulation on the loads in the DC-controllable load for the high-voltage plant, thereby improving the safety of frequency modulation. Moreover, the frequency modulation method is relatively simple.

Embodiment 3

To implement the above embodiments, the disclosure also provides an electronic device. The electronic device includes: a memory, a processor and a computer program stored in the memory and executable by the processor. When the program is executed by the processor, the method as described in the embodiment 2 is performed.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flowchart or described herein in other ways may be understood to include one or more modules, segments or portions of codes of executable instructions for achieving specific logical functions or steps in the process, and the scope of a preferred embodiment of the disclosure includes other implementations, in which the functions may be performed not in the order shown or discussed, including in a substantially simultaneous manner or in the reverse order, depending on the functions involved, as should be understood by those skilled in the art to which the embodiments of the disclosure belong.

Although the embodiments of disclosure have been shown and described above, it should be understood that above embodiments are just explanatory, and cannot be construed to limit the disclosure, for those skilled in the art, changes, alternatives, and modifications can be made to the embodiments without departing from spirit, principles and scope of the disclosure.

What is claimed is:

1. A system for fossil-fuel-power frequency modulation based on a Direct Current (DC)-controllable load for a high-voltage plant, comprising: a frequency modulator and the DC-controllable load for the high-voltage plant, wherein the frequency modulator is connected to the DC-controllable load for the high-voltage plant; wherein:
   the frequency modulator comprises: a centralized rectifier configured to adjust power of loads in the DC-controllable load for the high-voltage plant in response to a frequency modulation command;
   the DC-controllable load for the high-voltage plant is configured to respond to an adjustment of the power of loads performed by the centralized rectifier;
   the DC controllable load for the high-voltage plant comprises: a first 8.5 KV DC bus, a first high-voltage motor inversion driver, a first high-voltage motor, a first high-voltage motor switch for grid connection of the first high-voltage motor, a first high-voltage load inversion power supply, a first high-voltage load, and a first high-voltage load switch for grid connection of the first high-voltage load;
   the first high-voltage motor is connected to the first high-voltage motor inversion driver via the first high-voltage motor switch for grid connection of the first high-voltage motor;
   the first high-voltage motor inversion driver is connected to the first 8.5 KV DC bus;
   the first high-voltage load is connected to the first high-voltage load inversion power supply via the first high-voltage load switch for grid connection of the first high-voltage load;
   the first high-voltage load inversion power supply is connected to the first 8.5 KV DC bus;
   the DC-controllable load for the high-voltage plant further comprises: a first low-power load DC-DC step-down isolator, a first low-power load DC circuit breaker and a first low-power load;
   the first low-power load is connected to the first low-power load DC-DC step-down isolator via the first low-power load DC circuit breaker; and
   the first low-power load DC-DC step-down isolator is connected to the first 8.5 KV DC bus.

2. The system of claim 1, wherein the frequency modulator further comprises: a generator, a main transformer of the generator and a split-winding step-down transformer for the high-voltage plant;
   the generator is connected to a power grid system via the main transformer of the generator; and
   a high-voltage side of the split-winding step-down transformer for the high-voltage plant is connected to an outlet of the generator.

3. The system of claim 2, wherein the frequency modulator further comprises: a first controllable plant load switch for grid connection of a first controllable plant load and a second controllable plant load switch for grid connection of a second controllable plant load;
   the centralized rectifier comprises: a first centralized rectifier and a second centralized rectifier;
   the first centralized rectifier is connected to a low-voltage side winding A of the split-winding step-down transformer for the high-voltage plant via the first controllable plant load switch for grid connection of the first controllable plant load; and
   the second centralized rectifier is connected to a low-voltage side winding B of the split-winding step-down transformer for the high-voltage plant via the second controllable plant load for grid connection of the second controllable plant load.

4. The system of claim 3, wherein the DC-controllable load for the high-voltage plant further comprises: a second 8.5 KV DC bus, a second high-voltage motor inversion driver, a second high-voltage motor, a second high-voltage motor switch for grid connection of the second high-voltage motor, a second high-voltage load inversion power supply, a second high-voltage load, and a second high-voltage load switch for grid connection of the second high-voltage load;
   the second high-voltage motor is connected to the second high-voltage motor inversion driver via the second high-voltage motor switch for grid connection of the second high-voltage motor;
   the second high-voltage motor inversion driver is connected to the second 8.5 KV DC bus;
   the second high-voltage load is connected to the second high-voltage load inversion power supply via the second high-voltage load switch for grid connection of the second high-voltage load; and
   the second high-voltage load inversion power supply is connected to the second 8.5 KV DC bus.

5. The system of claim 4, wherein the DC-controllable load for the high-voltage plant further comprises: a second low-power load DC-DC step-down isolator, a second low-power load DC circuit breaker and a second low-power load;
   the second low-power load is connected to the second low-power load DC-DC step-down isolator via the second low-power load DC circuit breaker; and
   the second low-power load DC-DC step-down isolator is connected to the second 8.5 KV DC bus.

6. A frequency modulation method based on the system for fossil-fuel-power frequency modulation based on a DC-controllable load for a high-voltage plant of claim 1, comprising:

obtaining a frequency modulation command, and determining an active power to be adjusted based on the frequency modulation command; and adjusting, based on the active power to be adjusted, power of loads in the Direct Current (DC)-controllable load for the high-voltage plant by adopting a centralized rectifier and responding to the frequency modulation command.

7. The method of claim 6, wherein the active power to be adjusted is calculated according to a following equation:

$$\Delta P = m(f - f_0),$$

where $\Delta P$ represents the active power to be adjusted, f represents a target frequency to be adjusted for a generator corresponding to the frequency modulation command, $f_0$ represents an initial frequency of the generator, and m represents an active power droop coefficient.

8. An electronic device, comprising:

a memory;

a processor; and a computer program stored on the memory and executable by the processor, wherein when the computer program is executed by the processor, the processor is configured to perform the method of claim 6.

* * * * *